United States Patent
Pahlevaninezhad et al.

(10) Patent No.: US 12,184,074 B2
(45) Date of Patent: Dec. 31, 2024

(54) DC/DC CONVERTER USING A DIFFERENTIAL GEOMETRIC CONTROLLER

(71) Applicant: SPARQ SYSTEMS INC., Kingston (CA)

(72) Inventors: Majid Pahlevaninezhad, Kingston (CA); Praveen Jain, Kingston (CA)

(73) Assignee: SPARQ SYSTEMS INC., Kingston (CA)

( * ) Notice: Subject to any disclaimer, the term of this patent is extended or adjusted under 35 U.S.C. 154(b) by 249 days.

(21) Appl. No.: 17/887,904

(22) Filed: Aug. 15, 2022

(65) Prior Publication Data

US 2024/0055862 A1    Feb. 15, 2024

(51) Int. Cl.
*H02J 3/32* (2006.01)
*H02J 3/38* (2006.01)
*H02M 1/00* (2006.01)
*H02M 7/483* (2007.01)

(52) U.S. Cl.
CPC .............. *H02J 3/32* (2013.01); *H02J 3/381* (2013.01); *H02M 1/0012* (2021.05); *H02M 7/4837* (2021.05); *H02J 2300/26* (2020.01)

(58) Field of Classification Search
CPC .......... H02J 3/32; H02J 3/381; H02J 2300/26; H02M 7/4837; H02M 1/0012
See application file for complete search history.

(56) References Cited

U.S. PATENT DOCUMENTS

2015/0130281 A1*  5/2015  Sabripour ........... H01M 10/465
                                                            307/66

FOREIGN PATENT DOCUMENTS

CN        113872439 A   * 12/2021

OTHER PUBLICATIONS

Translation—CN113872439A (Year: 2014).*

* cited by examiner

*Primary Examiner* — Gary L Laxton
(74) *Attorney, Agent, or Firm* — Brion Raffoul

(57) ABSTRACT

Systems and methods relating to the conversion of DC power to AC power suitable for an AC power grid. DC power is received from one or more PV panels and is converted into DC power useful for charging an energy storage subsystem. The energy storage subsystem feeds into a DC/DC converter that converts the low voltage DC power into high voltage DC power suitable for a DC/AC inverter. The DC/AC inverter then converts the high voltage DC power into AC power suitable for an AC grid. A low voltage DC/DC converter can be used that is based on a differential geometry approach such that adjustable parameter values for components within the converter converge to nominal values as system parameters evolve.

11 Claims, 15 Drawing Sheets

DC/DC CONVERTER USING A DIFFERENTIAL GEOMETRIC CONTROLLER

TECHNICAL FIELD

The present invention relates to power conversion. More specifically, the present invention relates to systems and methods for converting power from photovoltaic panels into power suitable for charging an energy storage subsystem using a differential geometry approach. The systems and methods of the present invention are such that component voltages and currents within a low voltage DC/DC converter converge towards nominal values as system parameters change over time.

BACKGROUND

There is a growing number of photovoltaic (PV) applications where direct current/alternating current (DC/AC) inverters are required to provide maximum power point tracking (MPPT) to harvest maximum solar energy from PV panels and to thereby feed clean AC electricity into the power grid. However, the energy generated by solar energy harvesting systems depends on weather conditions and can be quite intermittent. Energy storage systems can effectively resolve the issue of intermittency for solar energy harvesting systems by storing the energy and releasing power when necessary.

Two different power electronic converters are commonly used, a converter for the PV and a converter for the energy storage. FIG. 1 is a block diagram for a known solar energy harvesting system with energy storage capability (Prior Art). From FIG. 1, it can be seen that two separate power electronic converters are used in the system. In this system, the PV inverter is used to perform MPPT for the PV panels and to convert the harvested energy into AC power that is compatible with the AC grid. The battery inverter controls the charge-discharge of the energy storage and also converts power from DC to AC. The main issue with the architecture in FIG. 1 is that two separate power electronic converters are needed and, as a result, the system may not be cost-effective. Another issue is that, when two separate power electronic converters are used, the PV inverter does not have real-time information for the battery (e.g., state of charge, etc.) while the battery inverter does not have real-time information for the PV system (e.g., available power, etc.). This architecture is therefore not able to optimise the power flow between different components of the system (i.e., between the PV panels, battery, the grid, and the various loads).

To address the above issues, other architectures that combine both the PV and the battery were introduced. FIG. 2 shows an exemplary arrangement of such an architecture (Prior Art). From FIG. 2, it can be seen that the system includes a DC/DC converter between the PV and the battery/energy storage unit, a DC/AC inverter to convert DC power from the battery and/or the DC/DC converter to AC power, and a low frequency transformer to increase the AC voltage to a voltage suitable for the grid and to provide galvanic isolation. In this architecture, the primary side of the transformer is low voltage (e.g., ~48V) and the secondary side is high voltage (~240V). Thus, the electronic components that are used can have low voltage ratings. The main drawback of this architecture is the low frequency transformer—this transformer is very bulky, heavy, and has significant losses. Thus, this architecture cannot be used for higher power (great than a few kW) and is not very scalable in terms of power In order to eliminate the low frequency transformer, the DC/DC converter can be designed to provide isolation. FIG. 3 shows a known architecture that does without the low frequency transformer (Prior Art). According to this figure, the DC/DC converter provides enough gain as well as the galvanic isolation. This architecture can provide both high efficiency and high power density. However, the energy storage subsystem needs to be high voltage for this architecture. That is, the energy storage subsystem needs to be higher in voltage than the peak voltage of the grid. For instance, if the inverter is designed to operate with the universal voltage range (e.g., $V_{rms}(max)=264$, $V_{peak}=372$), the minimum voltage of the energy storage subsystem should be fairly high (e.g., ~400 V). Accordingly, the voltage range of the energy storage subsystem is very limited and many types of batteries cannot be used with this architecture. In addition, this architecture may also have lower reliability issues due to the use of such high voltage energy storage subsystems.

Based on the above, there is therefore a need for systems and devices which mitigate if not avoid the shortcomings of the prior art.

SUMMARY

The present invention provides systems and methods relating to the conversion of DC power to AC power suitable for an AC power grid. DC power is received from one or more PV panels and is converted into DC power useful for charging an energy storage subsystem. The energy storage subsystem feeds into a DC/DC converter that converts the low voltage DC power into high voltage DC power suitable for a DC/AC inverter. The DC/AC inverter then converts the high voltage DC power into AC power suitable for an AC grid. A low voltage DC/DC converter can be used that is based on a differential geometry approach such that adjustable parameter values for components within the converter converge to nominal values as system parameters evolve.

In a first aspect, the present invention provides a system for converting DC power to AC power suitable for an AC power grid, said DC power coming from either at least one PV panel or an energy storage subsystem, the system comprising:

a DC/DC low voltage converter for producing output DC power from received from at least one PV panel, said output DC power being for charging an energy storage subsystem;

a bi-directional high voltage DC/DC converter for converting low voltage DC power from said energy storage subsystem into high voltage DC power, said high voltage DC/DC converter being coupled to said energy storage subsystem;

a DC/AC inverter receiving high voltage DC power from said high voltage DC/DC converter, said DC/AC inverter being for converting said high voltage DC power from said high voltage DC/DC converter into AC power suitable for use with a utility grid, said DC/AC inverter being coupled between said high voltage DC/DC converter and said grid; and a control system for controlling parameters across components of said system.

In a second aspect, the present invention provides a DC/DC converter comprising:

a power circuit for converting incoming power from at least one PV panel into output power suitable for charging an energy storage subsystem;
a control system comprising:
an MPPT/charge controller for maximizing power harvested from said at least one PV panel when said energy storage subsystem requires charging and for limiting said output power when said energy storage subsystem does not require charging, said MPPT/charge controller receiving power characteristics of said at least one PV panel and of said energy storage subsystem, said MPPT/charge controller controlling said output power by producing a reference inductor current value based on said power characteristics such that said reference inductor current value is adjusted based on whether said energy storage subsystem requires charging;
a differential geometric controller for determining vector fields necessary such that voltages of flying capacitors in said power circuit, over time, converge to an optimum value, said differential geometric controller receiving, as input, voltages of said flying capacitors in said power circuit and producing data detailing desired vector fields;
a current controller receiving a reference inductor current value from said MPPT/charge controller and receiving an actual inductor current value from an inductor in said power circuit, said current controller producing data detailing a duration of application for said desired vector fields;
a geometric modulator receiving said data detailing desired vector fields and data detailing said duration of application for said desired vector fields, said geometric modulator producing switching pulses for semiconductors in said power circuit based on said desired vector fields and on said duration of application for said desired vector fields.

In another aspect, the DC/DC low voltage converter is based on differential geometry such that capacitor voltages for capacitors in the low voltage converter converge to nominal values as operating conditions of said system changes.

In a further aspect, the power circuit comprises:
a plurality of pairs of circuit element modules, each of the circuit element modules comprising a semiconductor, a capacitor, and a diode, the capacitor and the diode being coupled in parallel with the semiconductor;
a plurality of said flying capacitors, each flying capacitor being associated with a specific pair of circuit element modules;
and wherein
each of the plurality of circuit element modules is coupled in series to other circuit element modules to form a chain of circuit element modules;
each flying capacitor being coupled between a first coupling point and a second coupling point in the chain of circuit element modules and each flying capacitor and each pair of circuit element modules are arranged in the chain such that for each specific flying capacitor, a specific pair of circuit element modules associated with the specific flying capacitor is coupled in the chain between a specific first coupling point and a specific second coupling point between which the specific flying capacitor is coupled;
wherein the switching pulses produced by the geometric modulator controls said semiconductors in the circuit element modules.

In another aspect of the present invention, the geometric modulator produces, for each pair of circuit element modules, a first pulse signal and a second pulse signal, the first pulse signal being for a first semiconductor in a first module of the pair of circuit element modules and the second pulse signal being for a second semiconductor in a second module in the first pair of circuit element modules, the first pulse signal being opposite to the second pulse signal.

Yet another aspect of the present invention provides that the differential geometric controller comprises:
a vector field selector block receiving voltages from the flying capacitors and from the at least one PV panel, the vector field selector block determining the desired vector fields based on the voltages; and
a vector field generator block for receiving an output of the vector field selector block and for producing the desired vector fields.

As another aspect of the present invention, the vector field selector uses either a look up table to look up suitable vector fields to produce the desired vector fields or a processor to calculate these desired vector fields.

In another aspect of the present invention, the power circuit further comprises a plurality of auxiliary capacitors and a plurality of tapped transformers, each of the plurality of auxiliary capacitors being coupled between an output lead of the converter and a tapped transformer, each tapped transformer being coupled between an auxiliary capacitor and one of the flying capacitors.

In a further aspect of the present invention, the power circuit further comprises a plurality of auxiliary capacitors and a plurality of tapped transformers, each of the plurality of auxiliary capacitors being coupled between a tapped transformer and one of the flying capacitors.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
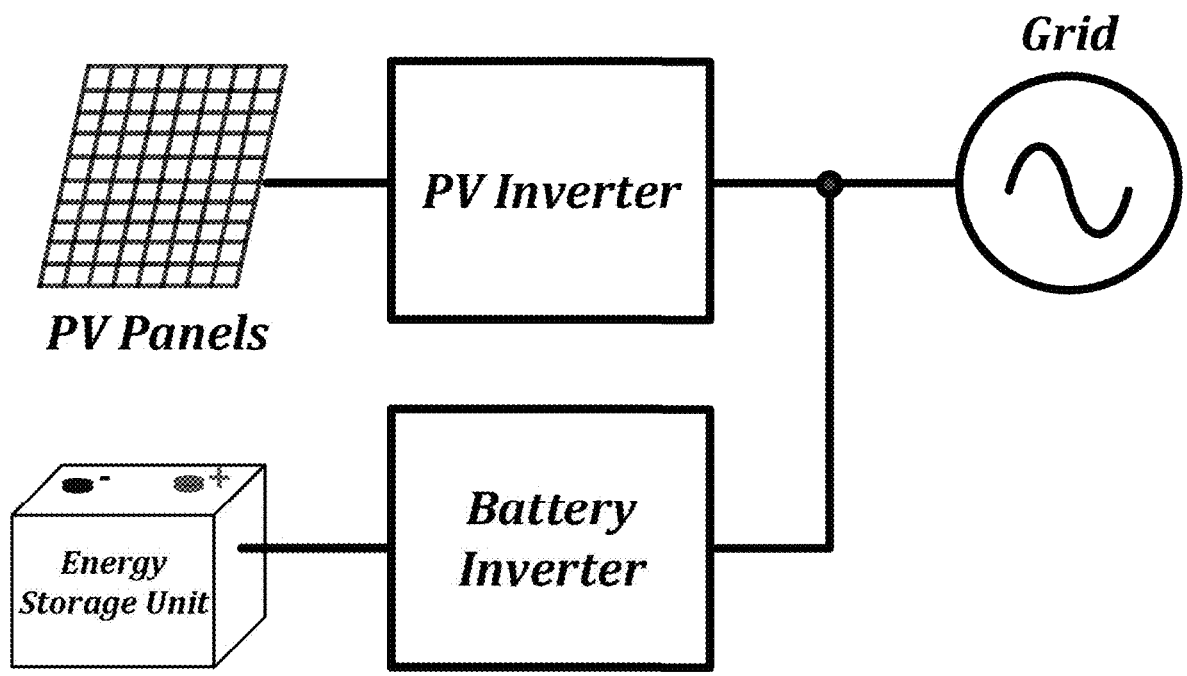
FIGS. 1 to 3 are block diagrams of systems according to the prior art.
Figure 2:
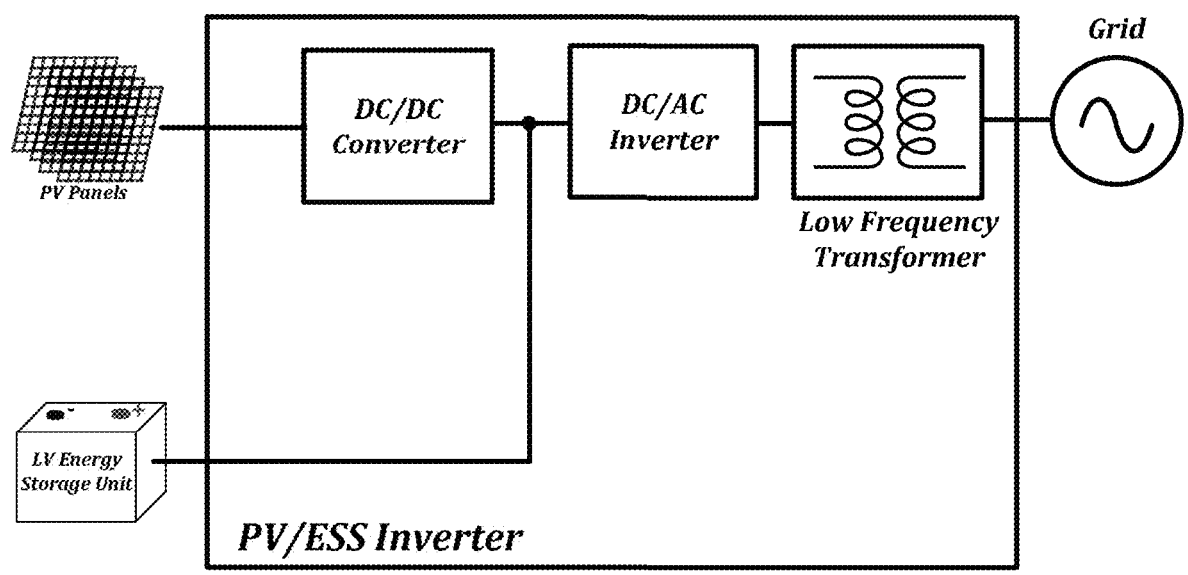
Figure 3:
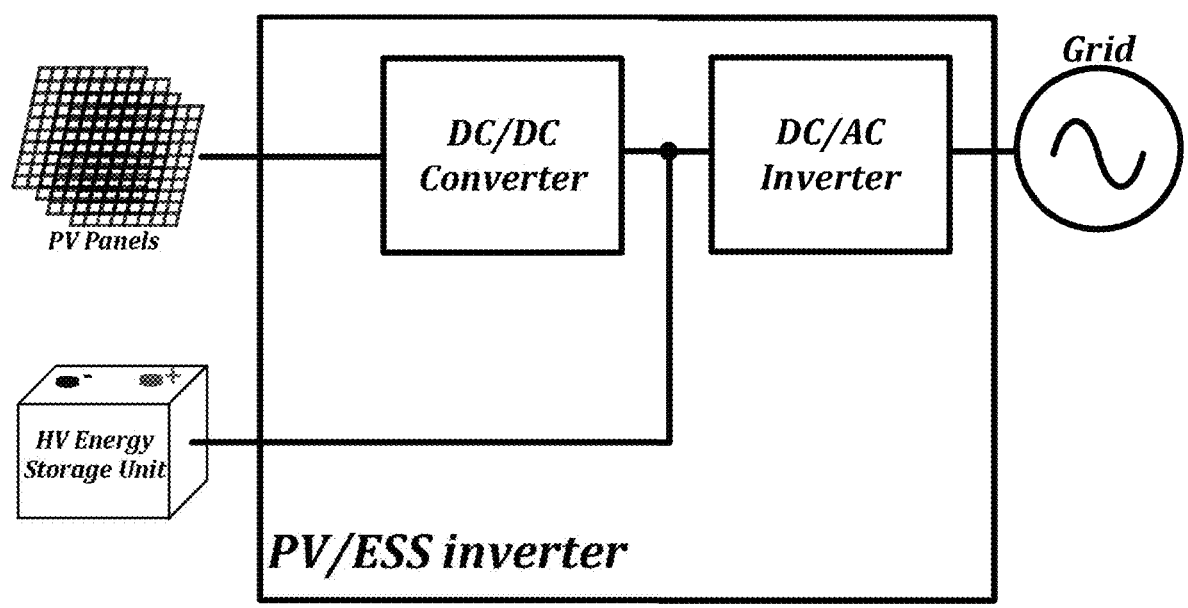
Figure 4:
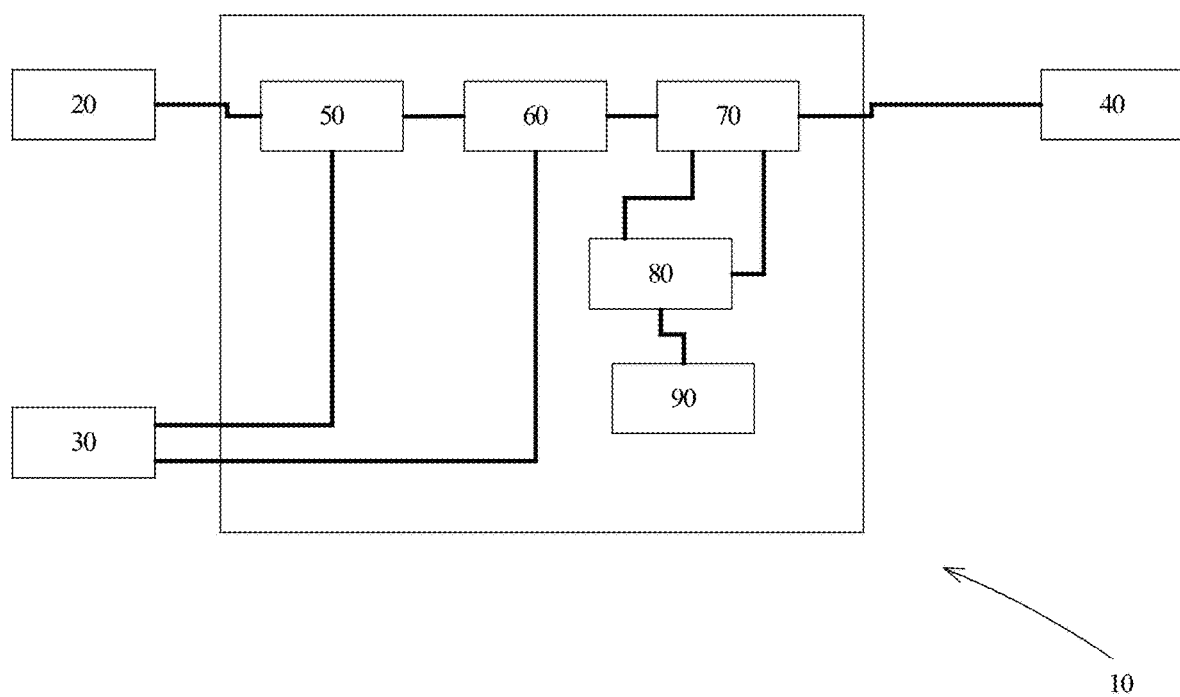
FIG. 4 is a block diagram of a system according to one aspect of the present invention.

In one aspect, the present invention provides a micro-inverter that couples to at least one PV panel, an energy storage subsystem (e.g., a battery subsystem), and a power grid. Referring to FIG. 4, a block diagram of such a micro-inverter is illustrated. As can be seen, the system 10 couples to at least one PV panel 20, an energy storage unit 30, and to a power grid 40. The system 10 includes a low voltage (LV) DC/DC converter 50 that receives DC power from the PV panels 20 and converts this DC power into DC power suitable for the energy storage unit 30. The LV DC/DC converter 50 feeds the converted DC power to the energy storage unit 30 to charge the unit 30. The system 10 also includes a bidirectional high voltage (HV) DC/DC converter 60 that is coupled to the energy storage unit 30. The HV DC/DC converter 60 converts the low voltage DC power it receives from the energy storage unit 30 into high voltage DC power suitable for a DC/AC inverter 70. The HV DC/DC converter also controls the power flow to and from the energy storage unit 30. The HV DC/DC converter 60 controls whether the energy storage unit 30 is being charged or not. As noted in the Figure, the system 10 includes a DC/AC inverter 70 that receives high voltage DC power from the HV DC/DC converter 60. The DC/AC inverter 70 produces AC power from the high voltage DC power and feeds this AC power to the grid 40. A control system 80 controls the various components of the system 10. A communications subsystem 90 communicates with the control system 80 to receive commands and send back readings as needed to external components/users.

Figure 5:
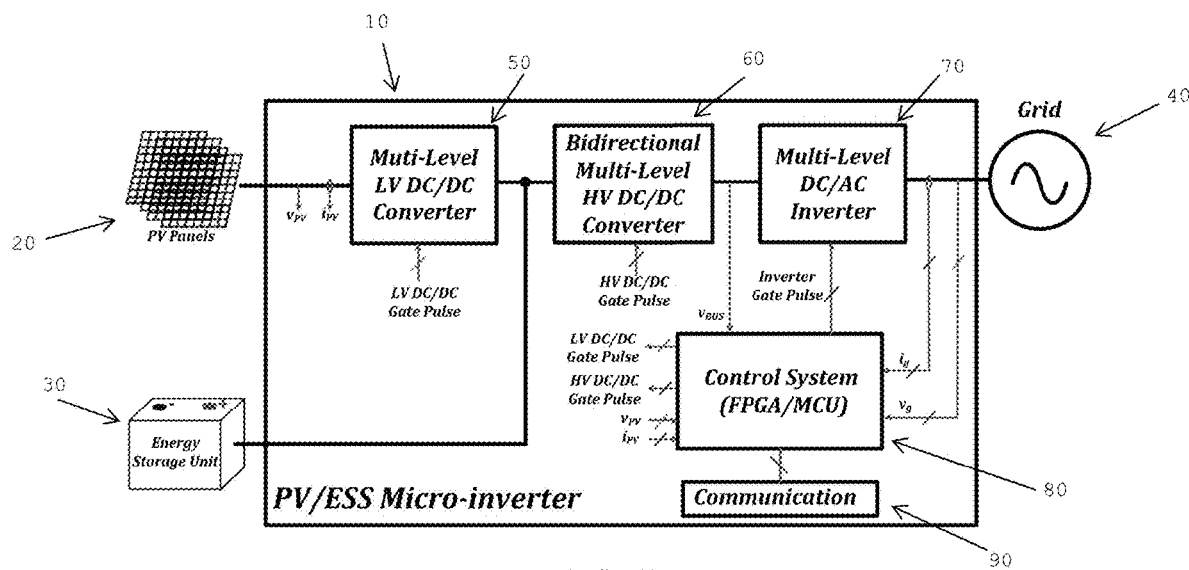
FIG. 5 is a block diagram of a specific implementation of the system illustrated in FIG. 4.

Referring to FIG. 5, a block diagram of one implementation of a micro-inverter according to one aspect of the present invention is illustrated. As can be seen, FIG. 5 shows the inputs and outputs of the various components of the system 10.

In one implementation, the LV DC/DC converter 50 DC/DC low voltage converter is based on differential geometry such that capacitor voltages for capacitors in the low voltage converter converge to nominal values as operating conditions of said system change.

As can be seen, the micro-inverter includes a HV DC/DC converter 60. This DC/DC converter 60 shapes a high frequency current passing through the transformer in the power circuit of the HV DC/DC converter. This current shaping is based on sensed operating conditions such as the battery/energy storage voltage, the available power from the PV panels, the output DC bus voltage, the grid voltage, and the grid current. The HV DC/DC converter 60 also tracks the long-term behaviour of voltages in flying capacitors used in its power circuit and this data can be used to optimize the converter's operation.

The DC/AC inverter 70 may also be based on a differential geometry control scheme. Such an inverter receives the operating conditions of the destination grid (including grid voltage and grid current), the capacitance voltages of the flying capacitors in its own power circuit, and the DC bus voltage. Based on these inputs, the DC/AC inverter controls its flying capacitor voltages such that these voltages converge to a suitable nominal/optimal solution as system conditions change.

Figure 6:
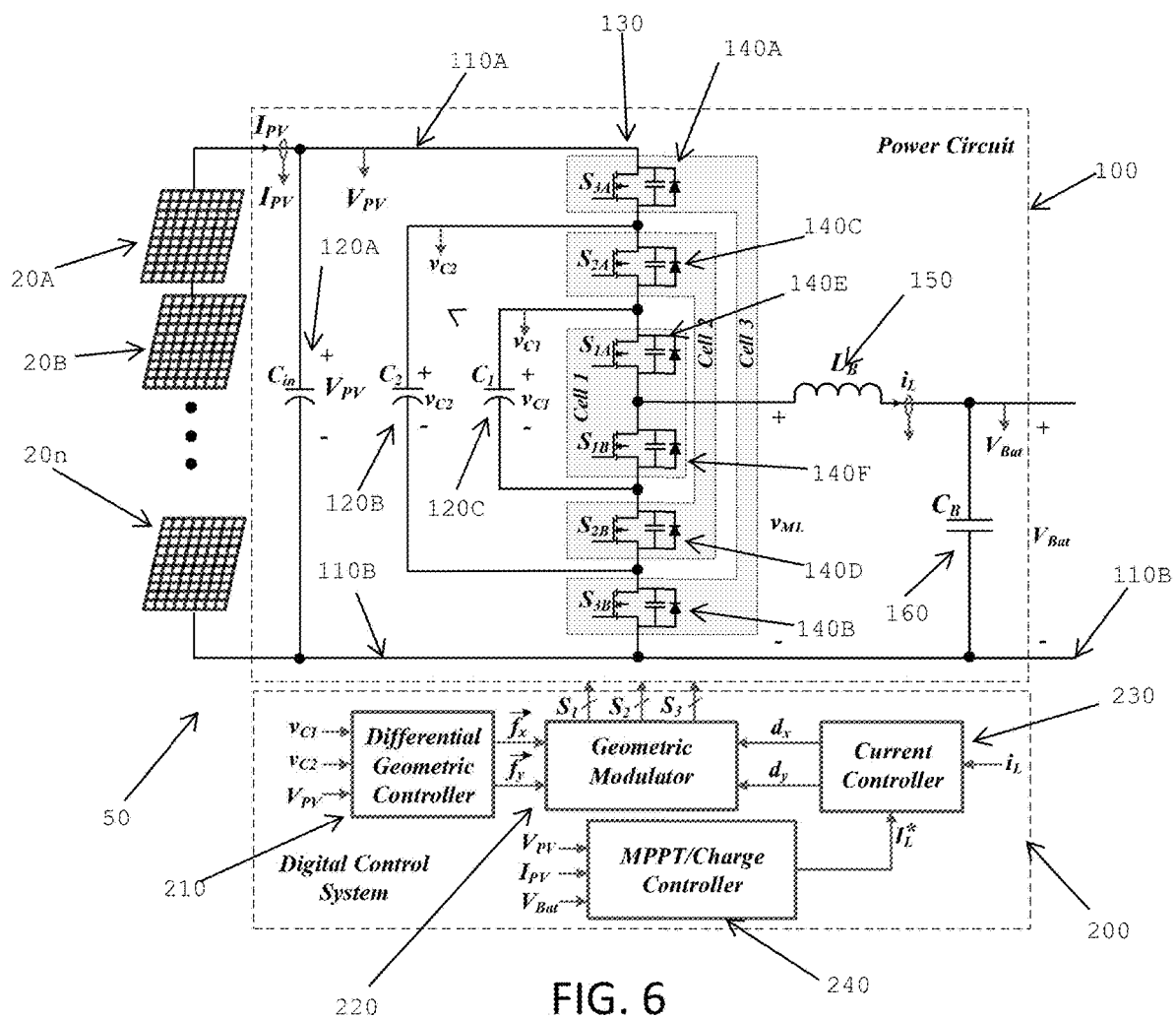
FIG. 6 is a block diagram of a DC/DC low voltage converter according to another aspect of the present invention.

Referring to FIG. 6, a circuit diagram of a low voltage (LV) DC/DC converter 50 according to one aspect of the present invention is illustrated. FIG. 6 shows an exemplary arrangement of the Multi-Level LV DC/DC Converter where, although the circuit is shown as a three-level circuit (i.e., having 3 cells), the circuit can be extended to an arbitrary number of levels. The Multi-Level LV DC/DC Converter includes the following sections:

A power circuit, which includes power semiconductors and passive components such as magnetics and capacitors. The power circuit is responsible for converting the DC voltage from the PV side to a DC voltage suitable for charging the energy storage.

A converter control system 200, which includes a Differential Geometric Controller block 210, Geometric Modulator block 220, Current Controller block 230, and an MPPT/Charge Controller block 240. The converter control system 200 generates the appropriate gate pulses for the power semiconductors such that various control tasks (e.g., MPPT of the PV panel and charge control of the energy storage) are performed.

As can be seen from FIG. 6, the LV DC/DC converter 50 includes a power circuit 100 and a converter controller 200. The power circuit 100 is coupled to PV panels 20A, 20B . . . 20n and between input leads 110A, 110B is a first flying capacitor 120, across which is sense $V_{PV}$ (or the PV voltage). In parallel to flying capacitor 120A is a chain 130 of circuit element modules 140A, 140B, 140C, 140D, 140E, 140F. These modules are coupled together in series and are arranged in pairs with module 140A being paired with module 140B (cell 3), module 140C being paired with module 140D (cell 2), and module 140E being paired with module 140F (cell 1). Two other flying capacitors 120B, 120C are present and are associated with a specific pair of circuit element modules, such that the pair of modules associated with a specific flying capacitor is coupled in parallel with that specific flying capacitor. As can be seen, flying capacitor 120A ($C_{in}$) is in parallel with modules 140A ($S_{3A}$), 140B ($S_{3B}$). Similarly, the circuit elements are arranged such that flying capacitor 120B ($C_2$) is coupled in parallel with modules 140C ($S_{2A}$) and 140D ($S_{2B}$). Finally, flying capacity 120C is coupled in parallel with modules 140E ($S_{1A}$) and 140F ($S_{1B}$). At the middle of the chain of modules is coupled an output inductor 150. The output of the power circuit is between the output of inductor 150 and lead 110B. An output capacitor 160 is coupled between the output of inductor 150 and lead 110B.

As can also be seen from FIG. 6, each circuit element module has a semiconductor in parallel with a capacitor and a diode. In one implementation, the semiconductor is a MOSFET and the capacitor and diode are in parallel between the source and drain leads of the MOSFET.

As noted above, the converter controller 200 includes a number of internal components. These components include a differential geometric controller 210, a geometric modulator 220, a current controller 230, and an MPPT/Charge controller 240.

Figure 7:
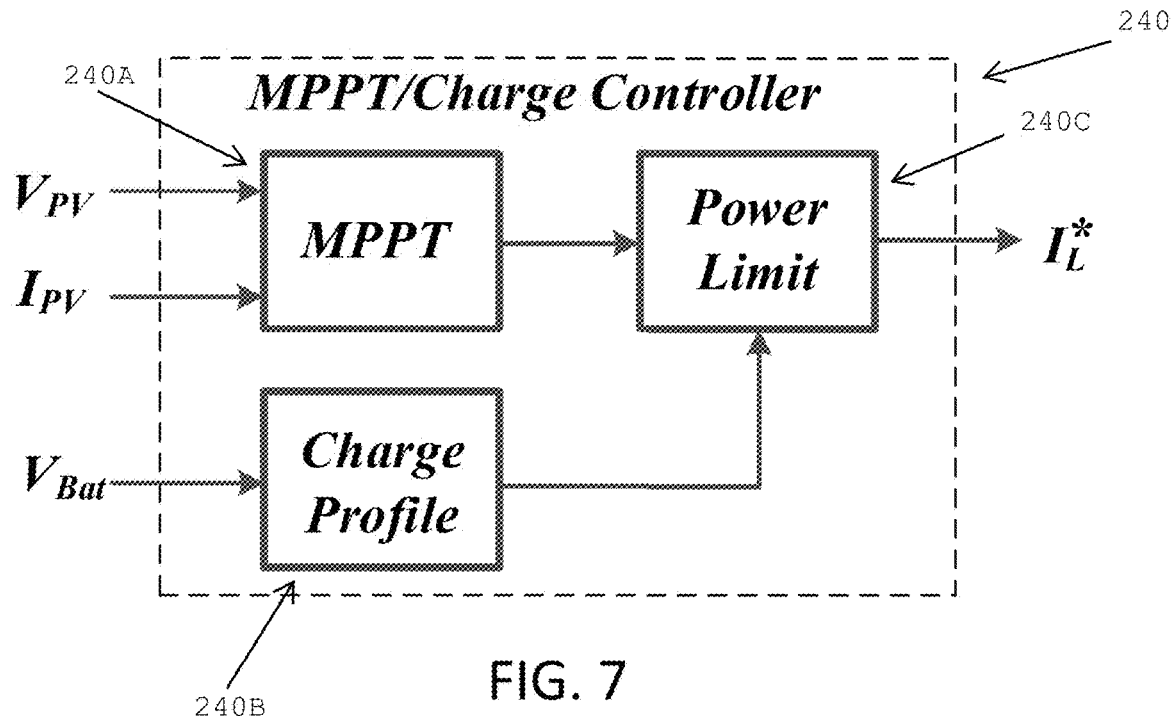
FIG. 7 is a block diagram of an MPPT/Charge controller as used in the low voltage converter illustrated in FIG. 6.

Referring to FIG. 7, a block diagram of the MPPT/Charge Controller block 240 is illustrated. The MPPT/charge block 240 includes an MPPT block 240A, a charge profile block 240B, and a power limit block 240C. The MPPT block 240A receives the voltage ($V_{PV}$) and current ($I_{PV}$) of the PV panels to implement the MPPT process, which performs maximum power point tracking. This MPPT block 240A searches for the maximum power point, the point where maximum power can be harvested from the PV panel. This MPPT block 240A produces the reference value for the inductor current ($I_L^*$) if the battery is not fully charged. If the battery is close to being fully charged, the Charge Profile block 240B limits the charging power by forcing the converter to deviate from the maximum power point. The Charge Profile Block 240B receives the battery voltage ($V_{Bat}$) and limits the charging power if the battery voltage is close to being fully charged. This is done by way of the power limit block 240C.

Figure 8:
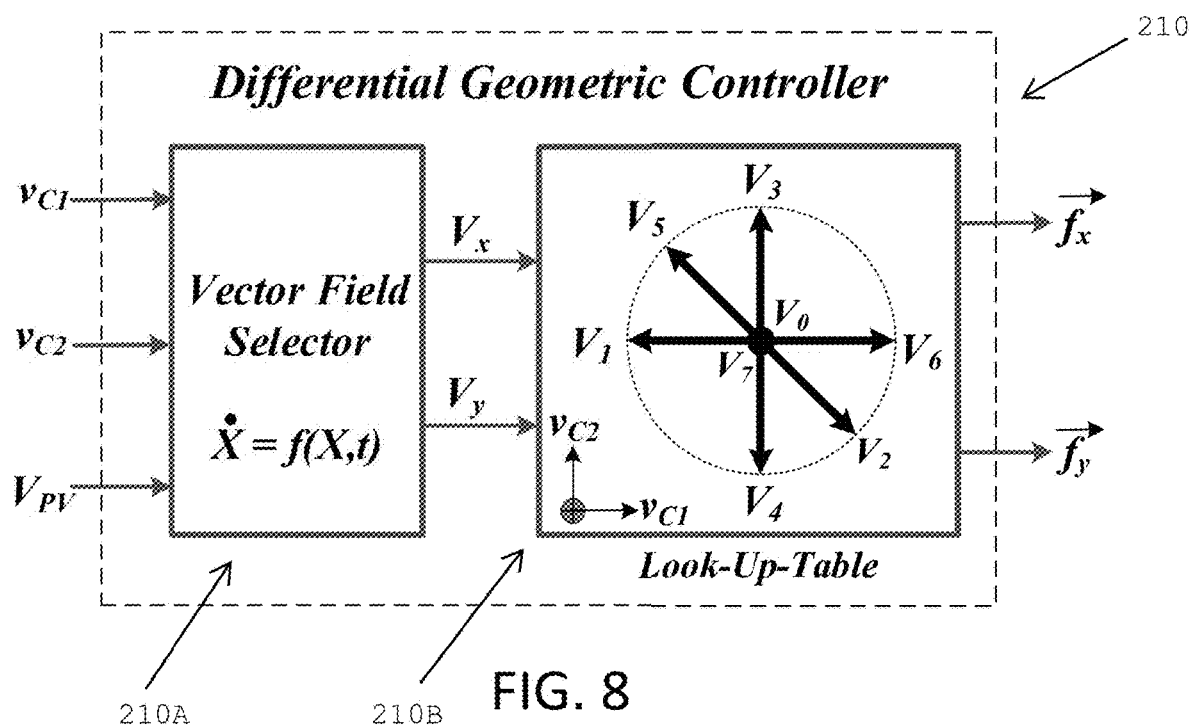
FIG. 8 is a block diagram of a differential geometric controller as used in the low voltage converter illustrated in FIG. 6.

Referring to FIG. 8, a block diagram of the Differential Geometric Controller block is illustrated. The differential geometric controller block 210 has a vector field selector block 210A and a vector field generation block 210B. The vector field selector block 210A determines what vector fields are necessary given the input while the vector field generation block 210B determines the components of those desired vector fields. As can be seen, the vector field selector block 210A receives the PV voltage ($V_{PV}$), the flying capacitors' voltages (i.e., $v_{c1}$ and $v_{c2}$) and the differential geometric controller block 210, as a whole, produces the appropriate vector fields that need to be applied in order to maintain the voltages of the flying capacitors within appropriate levels. The vector field generation block 210B uses a look-up table to determine the components of the desired vector fields as shown in FIG. 8. However, in some implementations, the look-up table can be replaced with a suitably programmed data device to calculate the components of the desired vector fields. For the three-level configuration illustrated in the Figures, the following table shows vectors fields that can be applied.

| Vector field | $S_{1A}$ | $S_{2A}$ | $S_{3A}$ | $v_{C1}$ | $v_{C2}$ | $v_{ML}$ |
|---|---|---|---|---|---|---|
| $\vec{f}_0 = (0, 0, 0)^T$ | 0 | 0 | 0 | = | = | 0 |
| $\vec{f}_1 = (1, 0, 0)^T$ | 1 | 0 | 0 | ↓ | = | $V_{PV}/3$ |
| $\vec{f}_2 = (0, 1, 0)^T$ | 0 | 1 | 0 | ↑ | ↓ | $V_{PV}/3$ |
| $\vec{f}_3 = (0, 0, 1)^T$ | 0 | 0 | 1 | = | ↑ | $V_{PV}/3$ |
| $\vec{f}_4 = (1, 1, 0)^T$ | 1 | 1 | 0 | = | ↓ | $2V_{PV}/3$ |
| $\vec{f}_5 = (1, 0, 1)^T$ | 1 | 0 | 1 | ↓ | ↑ | $2V_{PV}/3$ |
| $\vec{f}_6 = (0, 1, 1)^T$ | 0 | 1 | 1 | ↑ | = | $2V_{PV}/3$ |
| $\vec{f}_7 = (1, 1, 1)^T$ | 1 | 1 | 1 | = | = | $V_{PV}$ |

In the table above, "=" means constant, "↑" means increasing, and "↓" means decreasing.

The dynamic equations of the system are given by (considering $C_{in}$ and $C_B$ are relatively large):

$$\begin{pmatrix} C_1 \frac{dv_{C1}}{dt} \\ C_2 \frac{dv_{C3}}{dt} \\ L_B \frac{di_L}{dt} \end{pmatrix} =$$

$$\begin{pmatrix} i_L[S_{2A}(t) - S_{1A}(t)] \\ i_L[S_{3A}(t) - S_{2A}(t)] \\ v_{C1}[S_{1A}(t) - S_{2A}(t)] + v_{C2}[S_{2A}(t) - S_{3A}(t)] + V_{PV}[S_{3A}(t)] - V_{Bat} \end{pmatrix}$$

Where $$S_{iA}(t) = \begin{cases} 1 & \text{when } S_{iA}\text{:ON and } S_{iB}\text{:OFF} \\ 0 & \text{when } S_{iA}\text{:OFF and } S_{iB}\text{:ON} \end{cases}$$

for $i = 1, 2, 3, \ldots$

Referring to FIG. 8 and the Table above, appropriate vector fields should be applied in order to maintain the capacitor voltages within pre-determined intervals.

Figure 9:
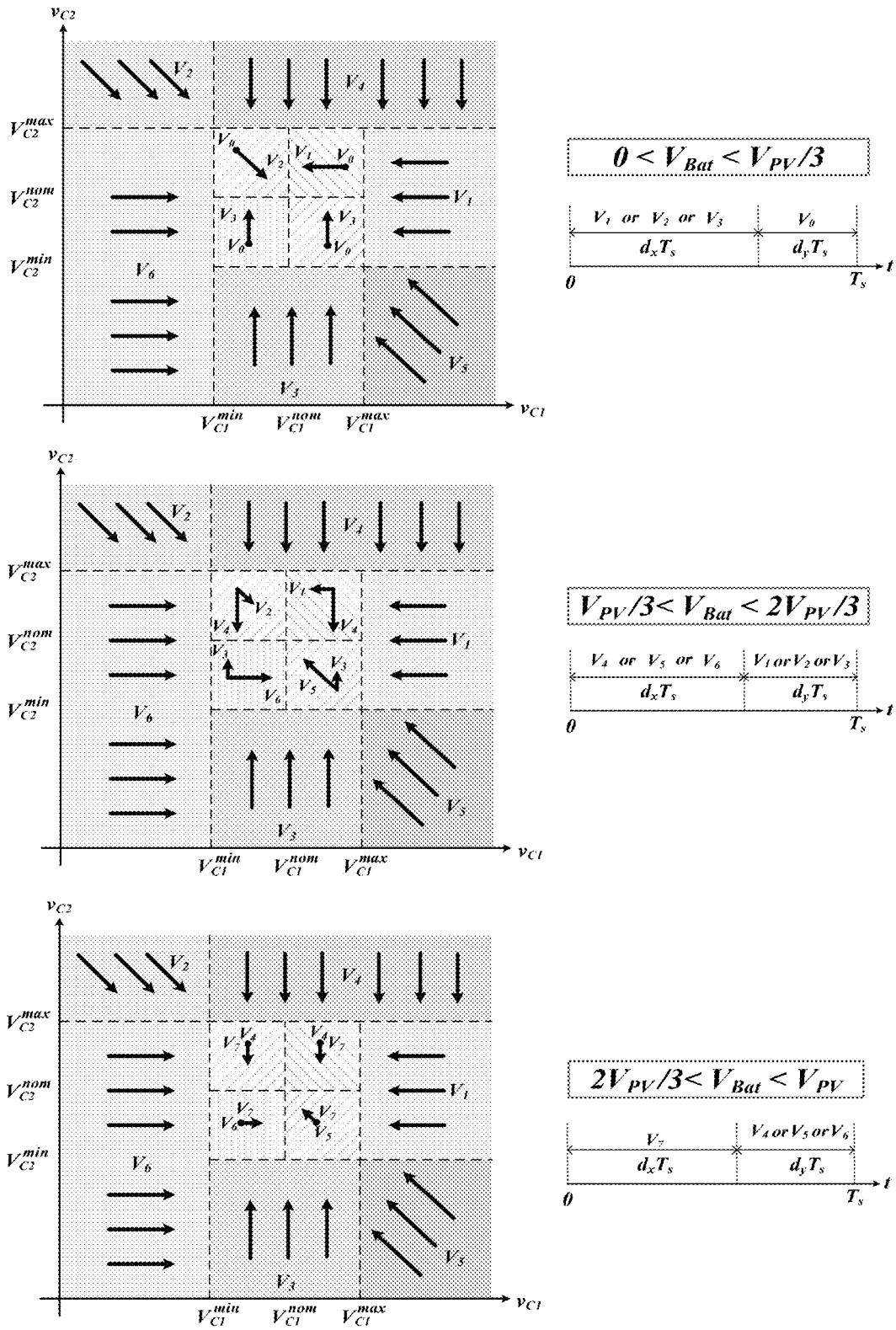
FIG. 9 graphically illustrates the use of desired vector fields generated based on $V_{bat}$ conditions as received by the differential geometric controller.

Referring to FIG. 9, illustrated are vector fields generated based on the input conditions. As can be seen, the Differential Geometric Controller 210 selects an appropriate vector field based on the location of the operating point on the configuration space of the system. The vector fields are selected such that the flying capacitors' voltages converge to their nominal values (i.e., $V_{C1}^{nom}$ and $V_{C2}^{nom}$). The Differential Geometric Controller 210 switches the vector fields such that they point to the pre-defined intervals for the capacitor voltages (i.e., $V_{C1}^{min}$ to $V_{C1}^{max}$ for $C_1$ and $V_{C2}^{min}$ to $V_{C2}^{max}$ for $C_2$.

Figure 10:
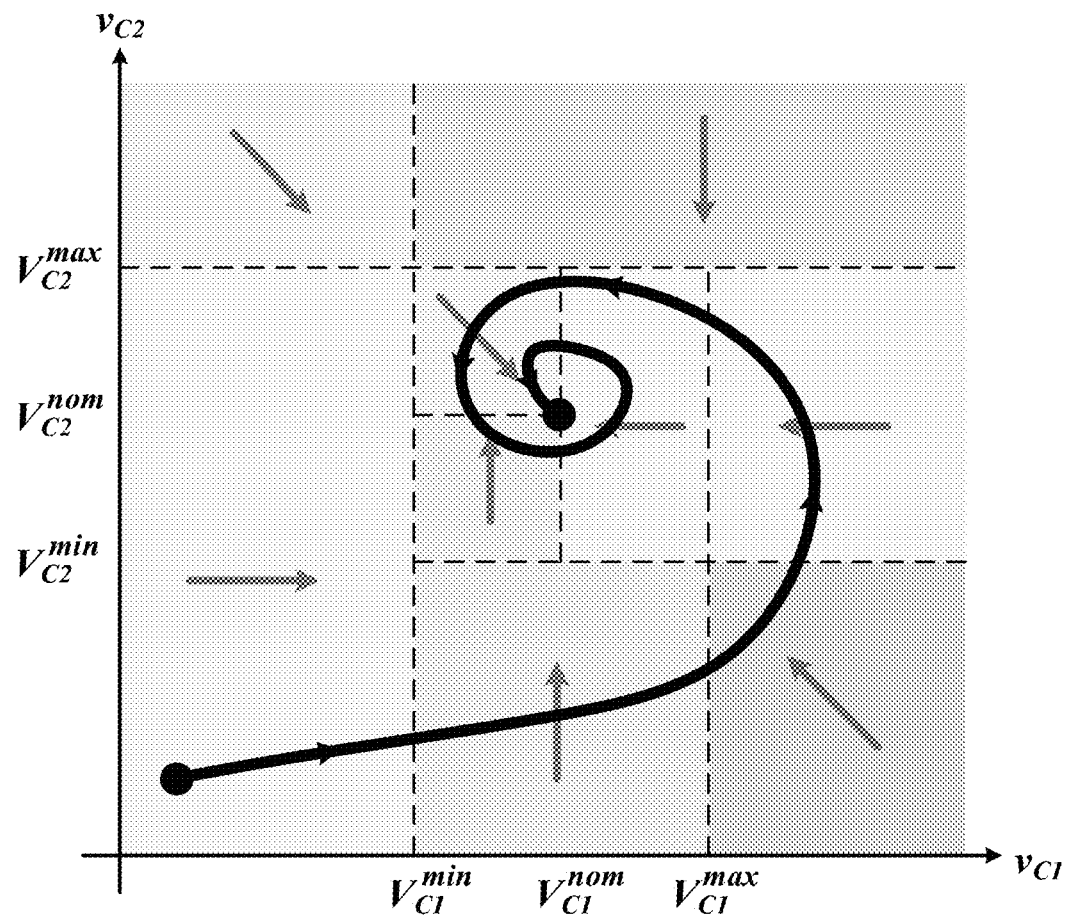
FIG. 10 illustrates the trajectory of the capacitor voltage as different vector fields are applied by the differential geometric controller.

Referring to FIG. 10, illustrated is an example of such a trajectory. As can be seen from FIG. 10, the capacitor voltages converge to a nominal or optimal solution as the conditions of the system change.

Figure 11:
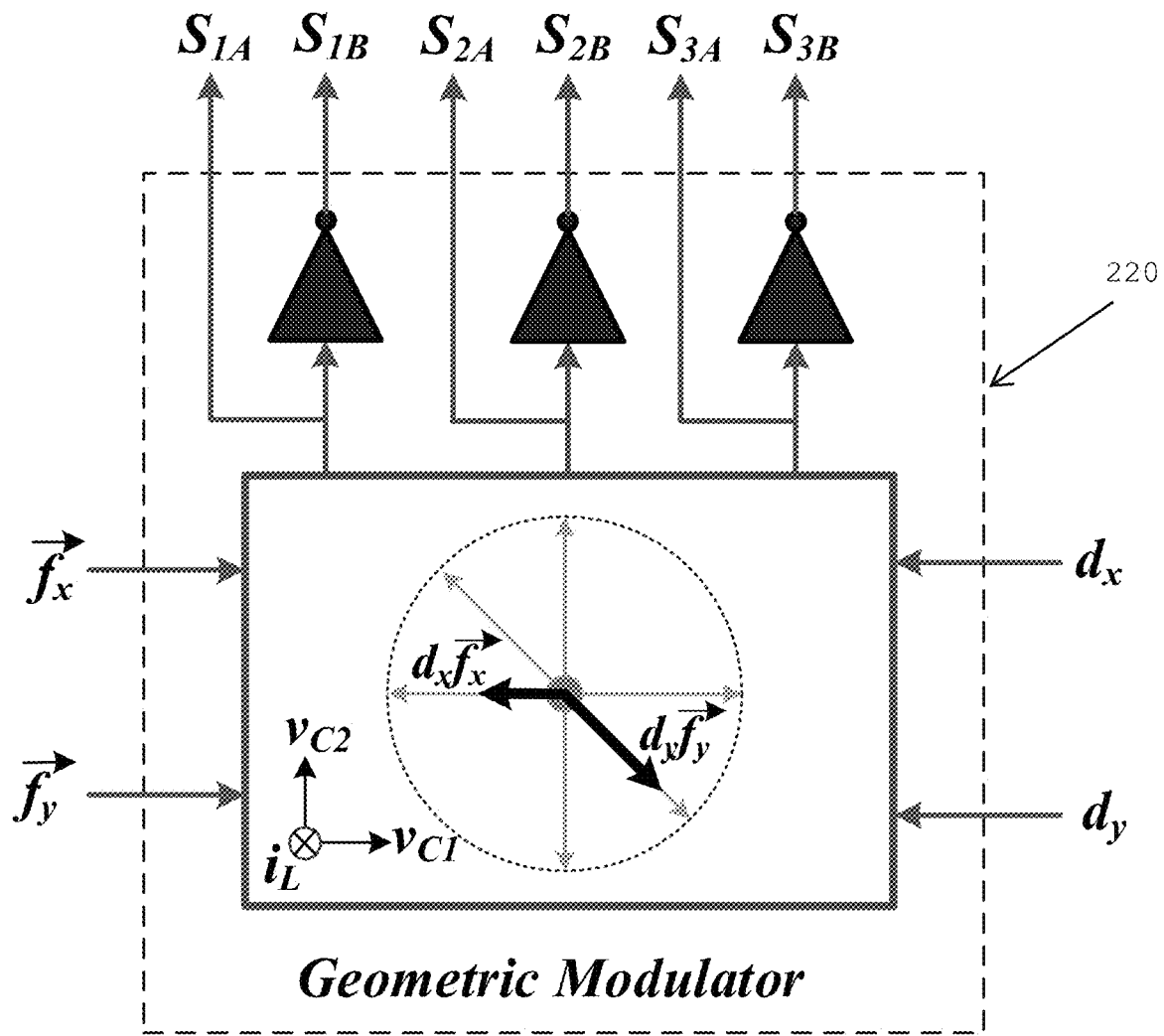
FIG. 11 is a block diagram of the geometric modulator as illustrated in FIG. 6.

To generate the desired vector fields, the geometric modulator 220 receives the desired vector fields from the differential geometric controller 210 and the duration of these fields from the current controller 230. Based on the desired vector fields and the duration of these fields, the geometric modulator 220 produces pulses for the various semiconductors in the power circuit. FIG. 11 shows a block diagram of the geometric modulator 220. As can be seen from FIG. 11, the geometric modulator 220 produces two signals for each pair of circuit element modules—one signal for each semiconductor in each pair of circuit element modules. As can be seen, the two signals are opposite to one another. As an example, the signal (or pulse) for $S_{1A}$ semiconductor is the opposite of the signal (or pulse) for the $S_{1B}$ semiconductor.

Figure 12:
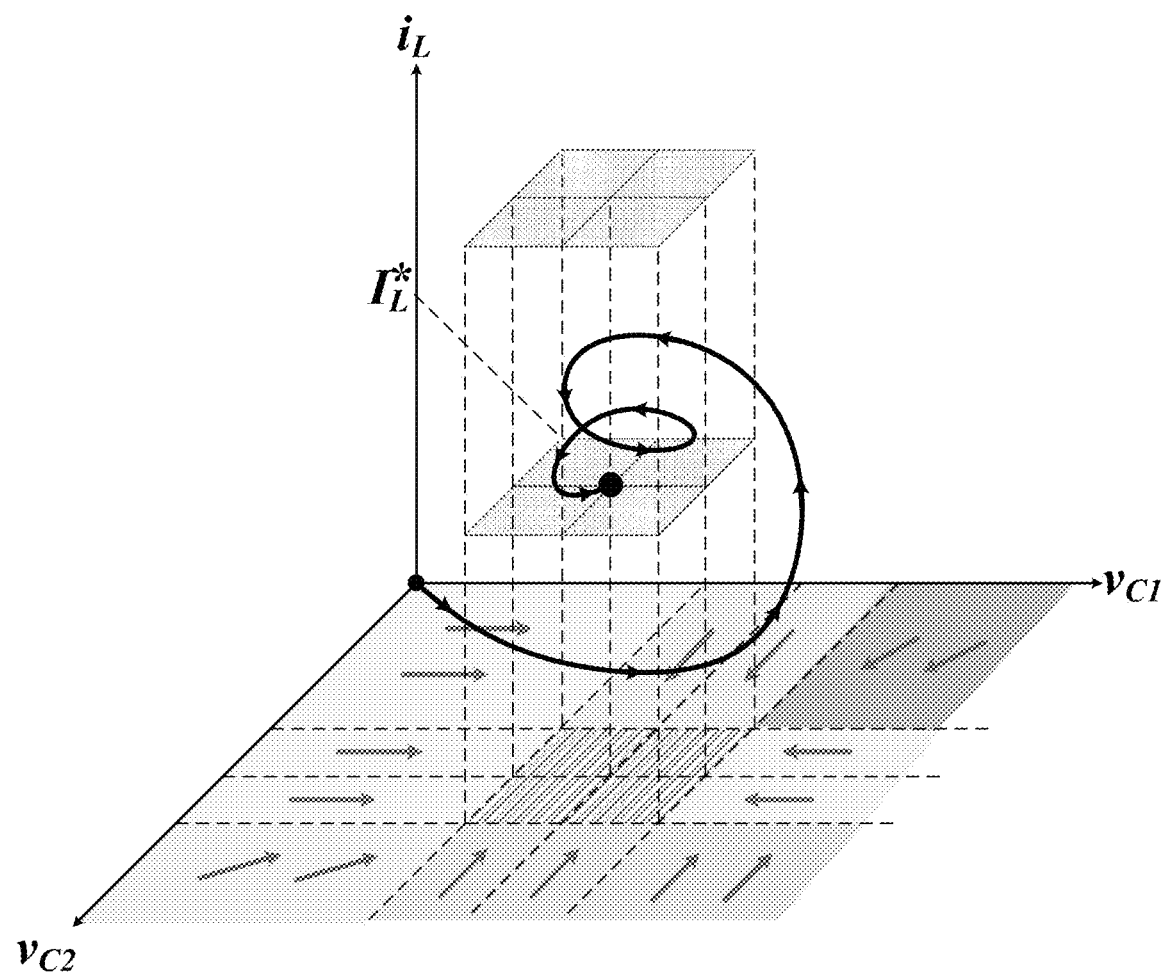
FIG. 12 illustrates the trajectory of an optimal solution for the inductor current as influenced by the vector fields applied by the differential geometric controller.

FIG. 11 shows that the respective vector fields generated by the Differential Geometric Controller 210 (i.e., $\vec{\theta}_x$ and $\vec{f}_y$) are received by the geometric modulator block 220. This block 220 also receives the durations for which the respective vector fields should be applied (i.e., $d_x$ and $d_y$). Based on these inputs, the block 220 generates appropriate switching pulses for the power semiconductors in the power circuit. The durations $d_x$ and $d_y$ are generated by the current controller block 230 such that the inductor current, $i_L$, tracks its reference value, $I_L^*$. FIG. 12 shows an exemplary trajectory of the system based on the controller.

Figure 13:
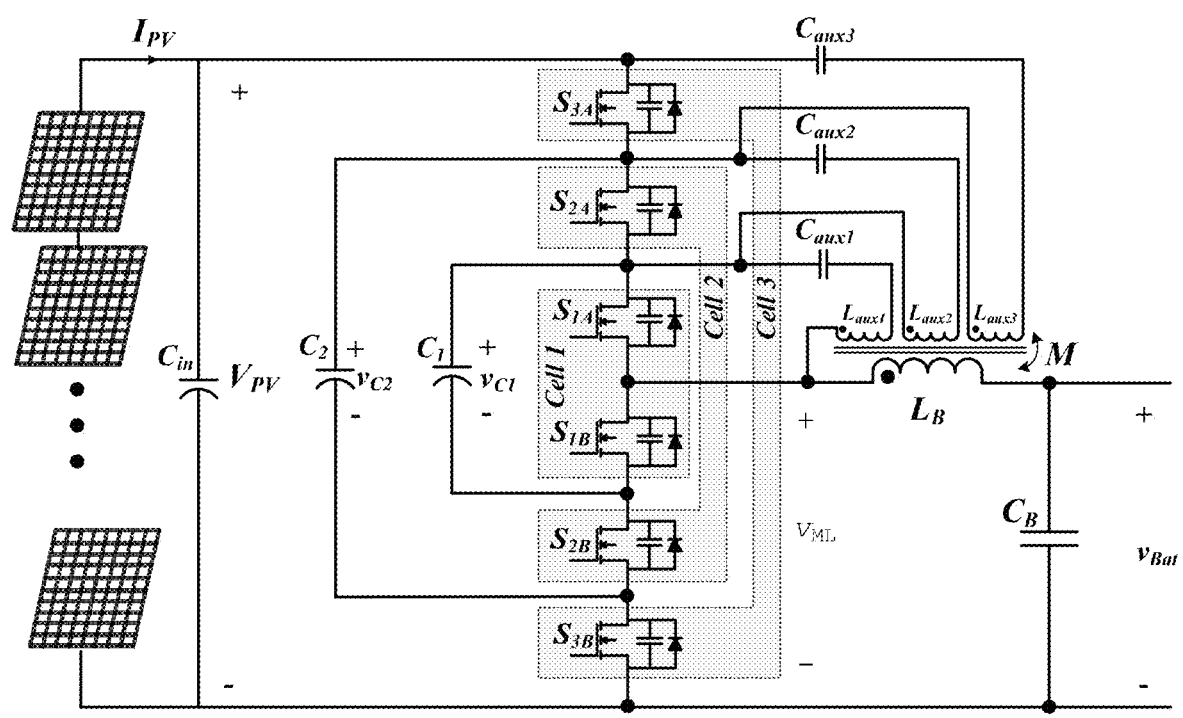
FIG. 13 is a circuit diagram of a soft-switched variant of the circuit in FIG. 6.
Figure 14:
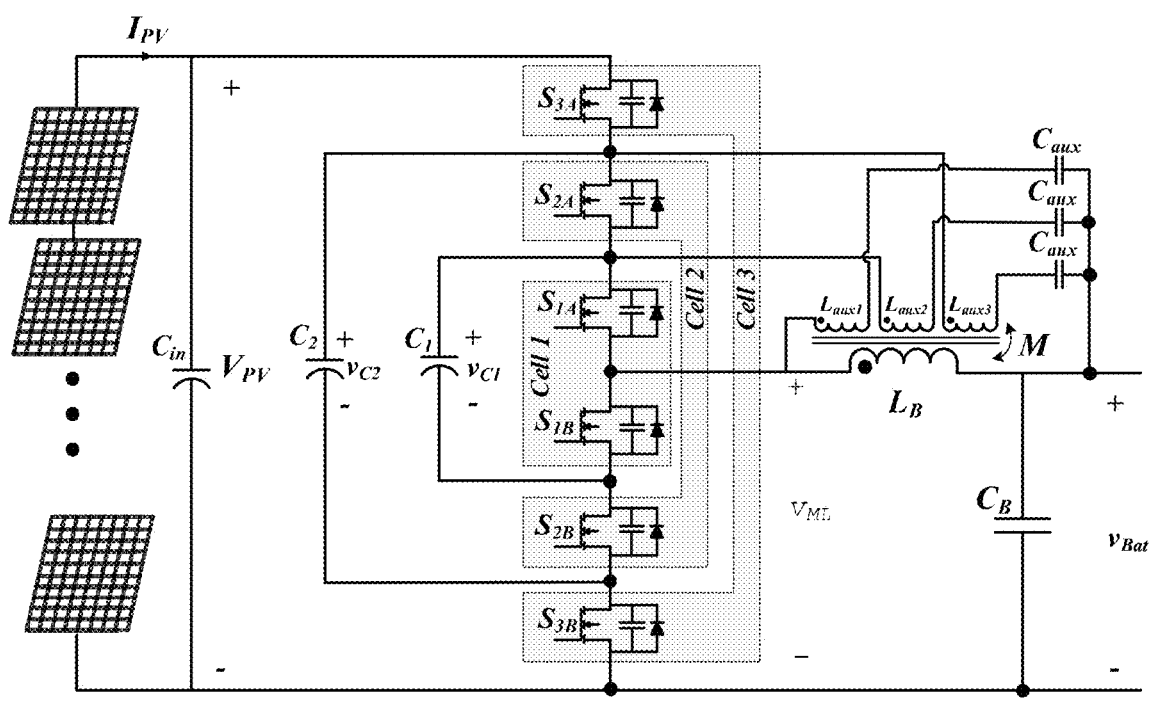
FIG. 14 is a circuit diagram of another soft-switched variant of the circuit in FIG. 6.

Referring to FIG. 13 and FIG. 14, two variants of the system in FIG. 6 are illustrated. As can be seen, the two variants each have the output inductor turned into a tapped magnetic circuit element (e.g. a transformer, an inductor, etc.) with multiple taps that are coupled to auxiliary capacitors. For both variants, three pairs of taps are attached to the magnetic circuit element. Again for both variants, each auxiliary capacitor is associated with a specific pair of taps to the magnetic circuit element. In the variant in FIG. 13, each auxiliary capacitor is coupled between a specific flying capacitor and a second tap of the auxiliary capacitor's associated pair of taps. As can be seen, each auxiliary capacitor is coupled between the second tap to the magnetic circuit element and a connection point coupled to a flying capacitor in the chain of circuit element modules. Each auxiliary capacitor in FIG. 13 is coupled to a different flying capacitor and, for two of the pairs of taps, each first tap of each pair of taps to the magnetic circuit element is coupled to a coupling point between a flying capacitor and an auxiliary capacitor. For one of the pairs of taps to the magnetic circuit element, the first tap is coupled to the midpoint of the chain of circuit element modules. The output for the variant in FIG. 13 is taken from the output of the tapped magnetic circuit element and the output lead (as shown in FIG. 6).

For the variant in FIG. 14, each pair of taps to the magnetic circuit element has a second tap coupled to an auxiliary capacitor. Each auxiliary capacitor in FIG. 14 is coupled to the output of the magnetic circuit element. For two of the pairs of taps to the magnetic circuit element, the first tap is coupled to a flying capacitor. For the first pair of taps, the first tap is coupled to the midpoint of the chain of circuit element modules. In these configurations in FIG. 13 and FIG. 14, the power semiconductors are switched under zero voltage, resulting in attenuating switching losses and achieving high efficiency. In addition, the current ripple of the inductor is substantially attenuated in these configurations.

Figure 15A:
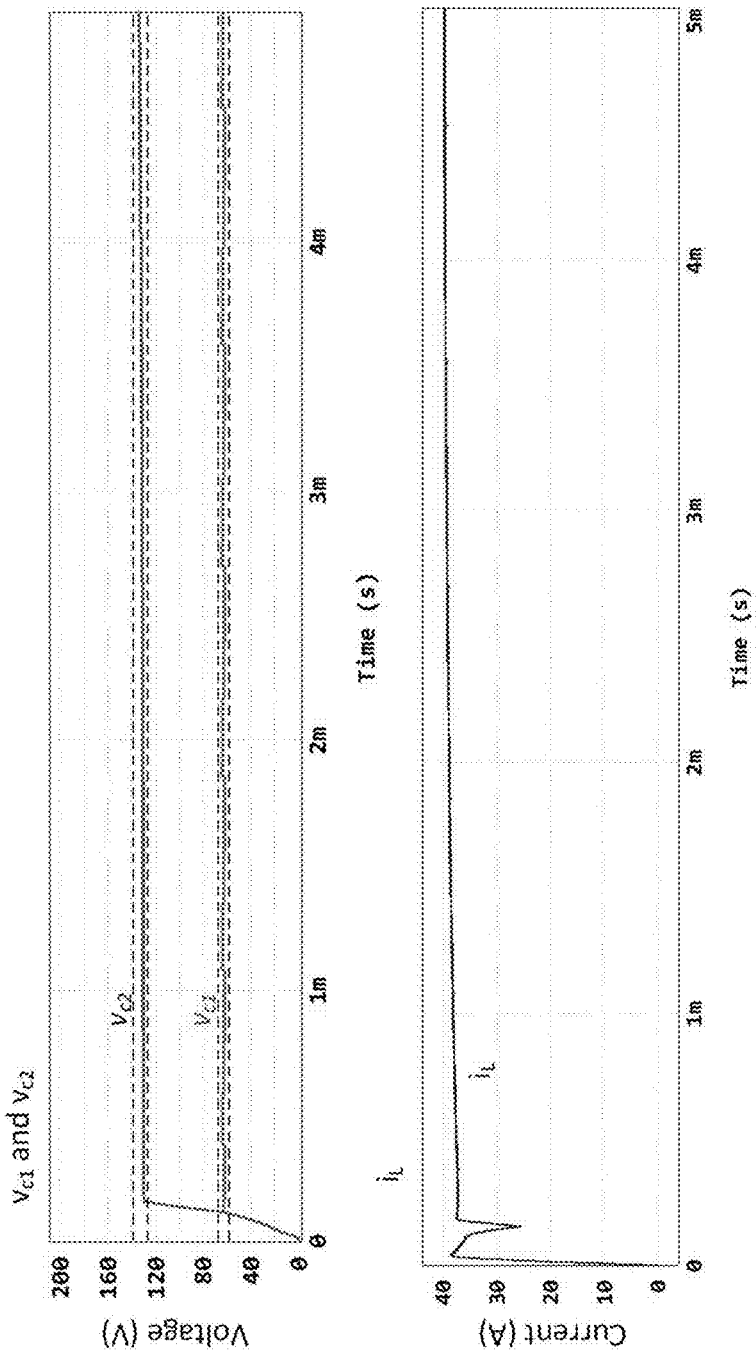
FIGS. 15A and 15B are waveforms for the converters in FIGS. 13 and 14 detailing the changes in the inductor voltage and the flying capacitor voltages.
Figure 15B:
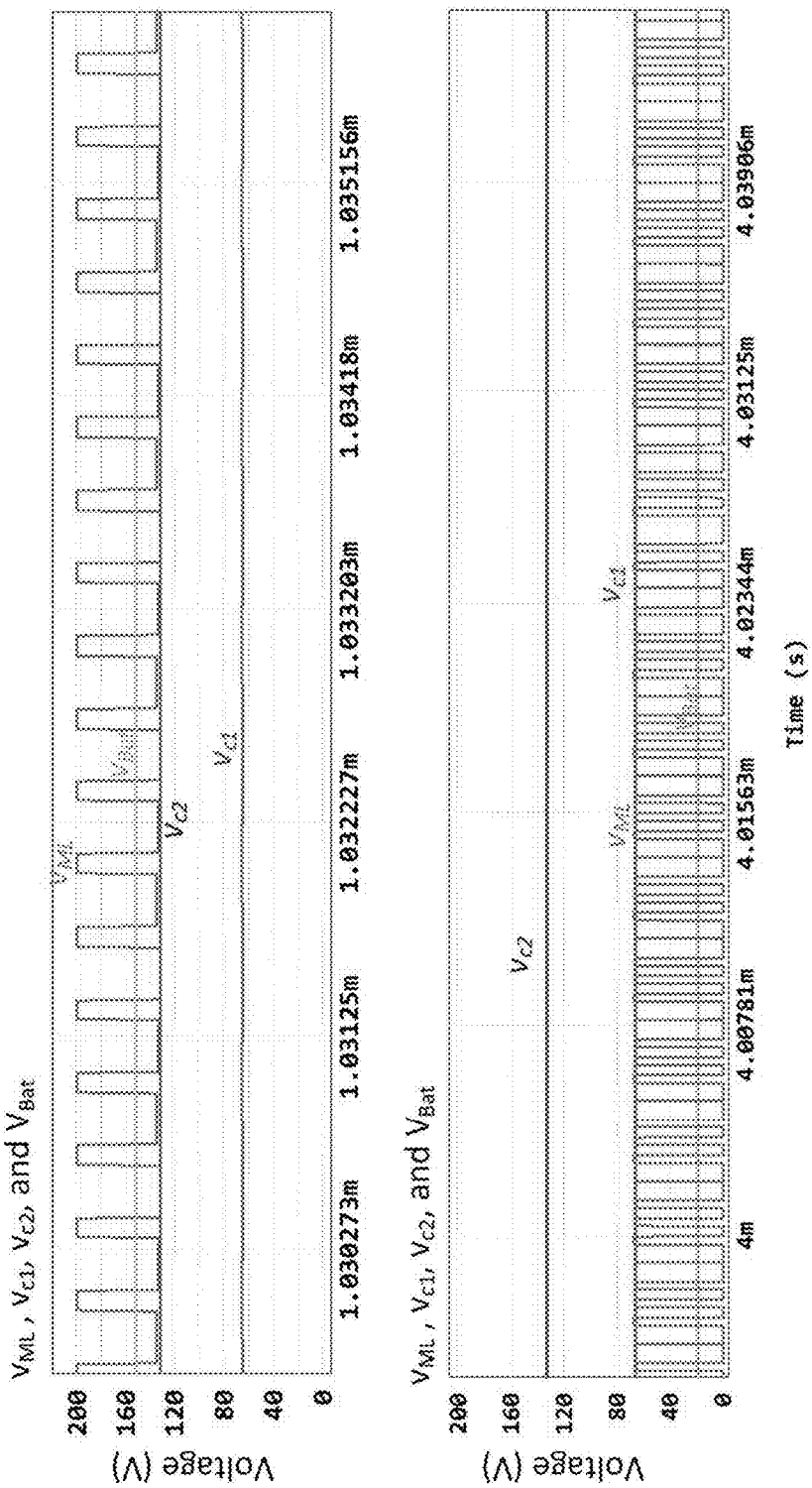

Referring to FIG. 15A and FIG. 15B, these two figures show the key waveforms of the converter in FIG. 6.

A person understanding this invention may now conceive of alternative structures and embodiments or variations of the above all of which are intended to fall within the scope of the invention as defined in the claims that follow.

We claim:

1. A system for converting DC power to AC power suitable for an AC power grid, said DC power coming from either at least one PV panel or an energy storage subsystem, the system comprising:
    a DC/DC low voltage converter for producing output DC power from received from at least one PV panel, said output DC power being for charging an energy storage subsystem;
    a bi-directional high voltage DC/DC converter for converting low voltage DC power from said energy storage subsystem into high voltage DC power, said high voltage DC/DC converter being coupled to said energy storage subsystem;
    a DC/AC inverter receiving high voltage DC power from said high voltage DC/DC converter, said DC/AC inverter being for converting said high voltage DC power from said high voltage DC/DC converter into AC power suitable for use with a utility grid, said DC/AC inverter being coupled between said high voltage DC/DC converter and said grid; and
    a control system for controlling parameters across components of said system,
    wherein said DC/DC low voltage converter comprises:
        a power circuit for converting incoming power from said at least one PV panel into output power suitable for charging said energy storage subsystem; and
        a control system comprising:
            an MPPT/charge controller for maximizing power harvested from said at least one PV panel when said energy storage subsystem requires charging and for limiting said output power when said energy storage subsystem does not require charging, said MPPT/charge controller receiving power characteristics of said at least one PV panel and of said energy storage subsystem, said MPPT/charge controller controlling said output power by producing a reference inductor current value based on said power characteristics such that said reference inductor current value is adjusted based on whether said energy storage subsystem requires charging;
            a differential geometric controller for determining vector fields necessary such that voltages of flying capacitors in said power circuit, over time, converge to an optimum value, said differential geometric controller receiving, as input, voltages of said flying capacitors in said power circuit and producing data detailing desired vector fields;
            a current controller receiving a reference inductor current value from said MPPT/charge controller and receiving an actual inductor current value from an inductor in said power circuit, said current controller producing data detailing a duration of application for said desired vector fields;
            a geometric modulator receiving said data detailing desired vector fields and data detailing said duration of application for said desired vector fields, said geometric modulator producing switching pulses for semiconductors in said power circuit based on said desired vector fields and on said duration of application for said desired vector fields.

2. The system according to claim 1, wherein said DC/DC low voltage converter is based on differential geometry such that capacitor voltages for capacitors in said low voltage converter converge to nominal values as operating conditions of said system changes.

3. A DC/DC converter comprising:
    a power circuit for converting incoming power from at least one PV panel into output power suitable for charging an energy storage subsystem;
    a control system comprising:
        an MPPT/charge controller for maximizing power harvested from said at least one PV panel when said energy storage subsystem requires charging and for limiting said output power when said energy storage subsystem does not require charging, said MPPT/charge controller receiving power characteristics of said at least one PV panel and of said energy storage subsystem, said MPPT/charge controller controlling said output power by producing a reference inductor current value based on said power characteristics such that said reference inductor current value is adjusted based on whether said energy storage subsystem requires charging;
        a differential geometric controller for determining vector fields necessary such that voltages of flying capacitors in said power circuit, over time, converge to an optimum value, said differential geometric controller receiving, as input, voltages of said flying capacitors in said power circuit and producing data detailing desired vector fields;
        a current controller receiving a reference inductor current value from said MPPT/charge controller and receiving an actual inductor current value from an inductor in said power circuit, said current controller producing data detailing a duration of application for said desired vector fields; and
        a geometric modulator receiving said data detailing desired vector fields and data detailing said duration of application for said desired vector fields, said geometric modulator producing switching pulses for semiconductors in said power circuit based on said desired vector fields and on said duration of application for said desired vector fields.

4. The DC/DC converter according to claim 3, wherein said power circuit comprises:
    a plurality of pairs of circuit element modules, each of said circuit element modules comprising a semiconductor, a capacitor, and a diode, said capacitor and said diode being coupled in parallel with said semiconductor; and
    a plurality of said flying capacitors, each flying capacitor being associated with a specific pair of circuit element modules;
    and wherein
        each of said plurality of circuit element modules is coupled in series to other circuit element modules to form a chain of circuit element modules;

each flying capacitor is coupled between a first coupling point and a second coupling point in said chain of circuit element modules and each flying capacitor and each pair of circuit element modules are arranged in said chain such that, for each specific flying capacitor, a specific pair of circuit element modules associated with said specific flying capacitor is coupled in said chain between a specific first coupling point and a specific second coupling point between which said specific flying capacitor is coupled; and said switching pulses produced by said geometric modulator control said semiconductors in said circuit element modules.

5. The DC/DC converter according to claim 4, wherein each circuit element module comprises:
MOSFET; and
a module capacitor and a diode;
wherein said module capacitor and said diode are coupled in parallel between a drain and a source of said MOSFET.

6. The DC/DC converter according to claim 3, wherein said geometric modulator produces, for each pair of circuit element modules, a first pulse signal and a second pulse signal, said first pulse signal being for a first semiconductor in a first module of said pair of circuit element modules and said second pulse signal being for a second semiconductor in a second module in said first pair of circuit element modules, said first pulse signal being opposite to said second pulse signal.

7. The DC/DC converter according to claim 3, wherein said differential geometric controller comprises:
a vector field selector block receiving voltages from said flying capacitors and from said at least one PV panel, said vector field selector block determining said desired vector fields based on said voltages; and
a vector field generator block for receiving an output of said vector field selector block and for producing the desired vector fields.

8. The DC/DC converter according to claim 7, wherein said vector field generator block comprises a look up table, said vector field generator block selecting vector fields from said look up table based on said desired vector fields, selected vector fields from said look up table being output as said desired vector fields.

9. The DC/DC converter according to claim 7, wherein said vector field generator block comprises a processor, said processor calculating vector fields based on said desired vector fields, said vector fields calculated by said processor being output as said desired vector fields.

10. The DC/DC converter according to claim 3, wherein said power circuit comprises:
a plurality of pairs of circuit element modules, each of said circuit element modules comprising a semiconductor, a capacitor, and a diode, said capacitor and said diode being coupled in parallel with said semiconductor;
a plurality of said flying capacitors, each flying capacitor being associated with a specific pair of circuit element modules; and
a plurality of auxiliary capacitors and a plurality of tapped magnetic circuit elements;
and wherein each of said plurality of circuit element modules is coupled in series to other circuit element modules to form a chain of circuit element modules;
each flying capacitor is coupled between a first coupling point and a second coupling point in said chain of circuit element modules and each flying capacitor and each pair of circuit element modules are arranged in said chain such that for each specific flying capacitor, a specific pair of circuit element modules associated with said specific flying capacitor is coupled in said chain between a specific first coupling point and a specific second coupling point between which said specific flying capacitor is coupled;
each of said plurality of auxiliary capacitors is being coupled between an output lead of said converter and a tapped magnetic circuit element;
each of said plurality of magnetic circuit elements is coupled between a flying capacitor and an auxiliary capacitor; and
said switching pulses produced by said geometric modulator control said semiconductors in said circuit element modules.

11. The DC/DC converter according to claim 3, wherein said power circuit comprises:
a plurality of pairs of circuit element modules, each of said circuit element modules comprising a semiconductor, a capacitor, and a diode, said capacitor and said diode being coupled in parallel with said semiconductor;
a plurality of said flying capacitors, each flying capacitor being associated with a specific pair of circuit element modules; and
a plurality of auxiliary capacitors and a plurality of tapped magnetic circuit elements;
and wherein
each of said plurality of circuit element modules is coupled in series to other circuit element modules to form a chain of circuit element modules;
each flying capacitor is coupled between a first coupling point and a second coupling point in said chain of circuit element modules and each flying capacitor and each pair of circuit element modules are arranged in said chain such that for each specific flying capacitor, a specific pair of circuit element modules associated with said specific flying capacitor is coupled in said chain between a specific first coupling point and a specific second coupling point between which said specific flying capacitor is coupled;
each of said plurality of auxiliary capacitors is coupled between a tapped magnetic circuit element and one of said flying capacitors;
each of said plurality of magnetic circuit elements is coupled between a flying capacitor and an auxiliary capacitor; and
said switching pulses produced by said geometric modulator control said semiconductors in said circuit element modules.

* * * * *